Aug. 20, 1935.  J. L. SHROYER  2,012,109
FLUID PRESSURE CONTROL SYSTEM FOR AUTOMOBILE POWER TESTING DEVICES
Filed April 28, 1930  4 Sheets-Sheet 1
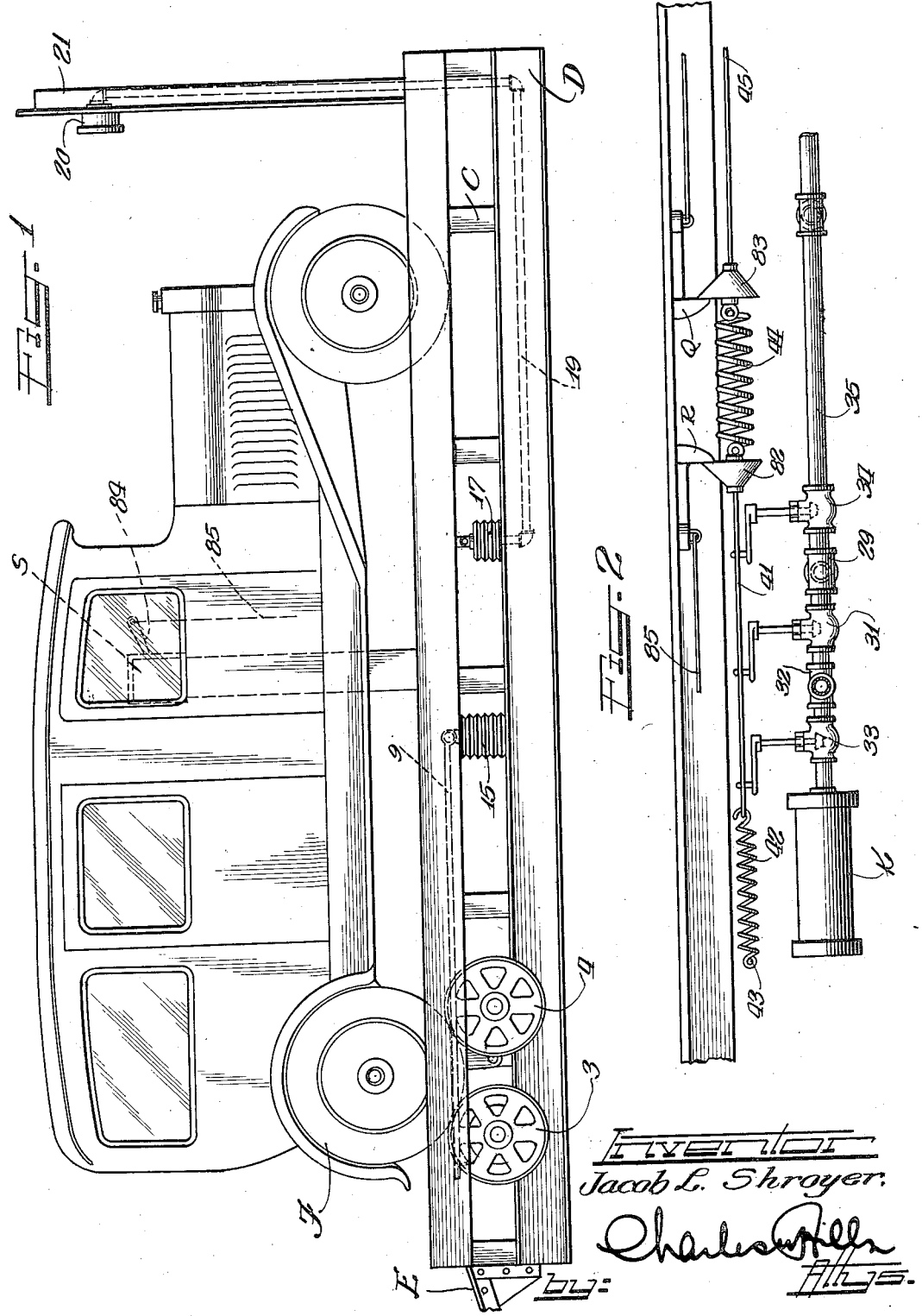

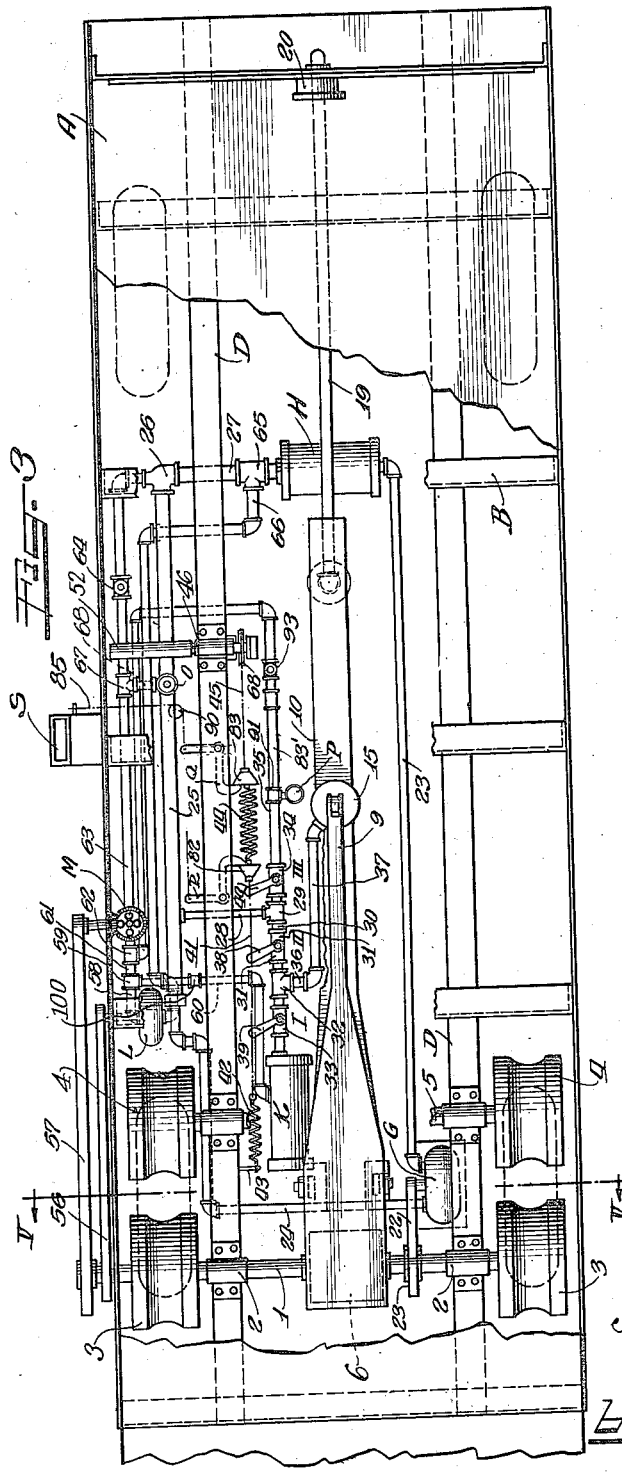

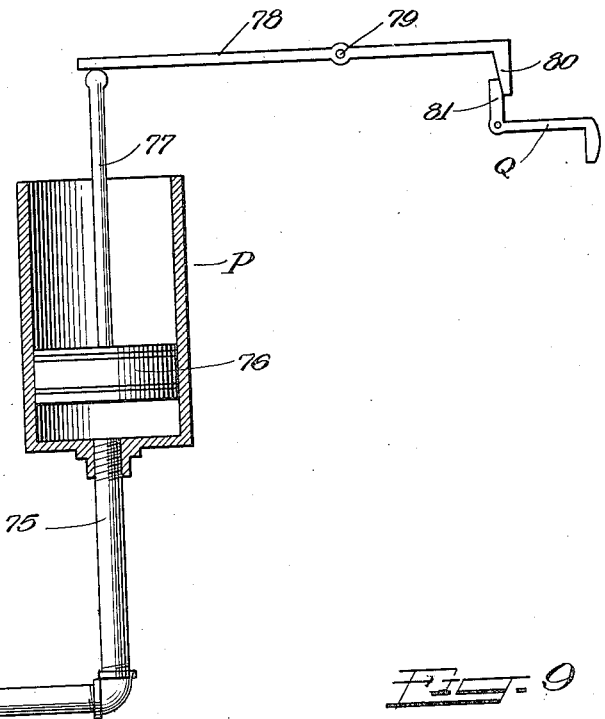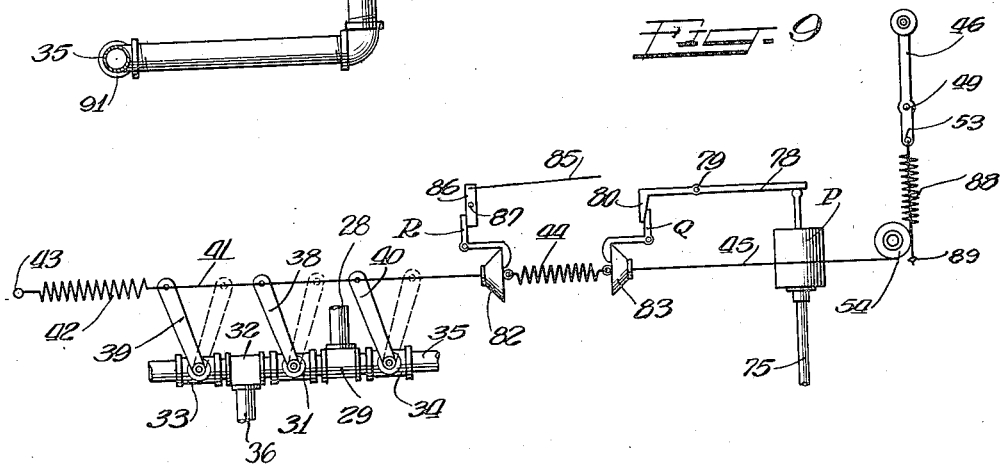

Patented Aug. 20, 1935

2,012,109

UNITED STATES PATENT OFFICE 2,012,109

FLUID PRESSURE CONTROL SYSTEM FOR AUTOMOBILE POWER TESTING DEVICES

Jacob L. Shroyer, Oak Park, Ill.

Application April 28, 1930, Serial No. 447,991

13 Claims. (Cl. 265—24)

This invention relates to a fluid pressure control system for automobile power testing devices wherein the pressure control system is effective for maintaining the testing device or apparatus at a constant speed wherein the braking effects due to the pressure created balances the effective power of any automobile being tested.

An object of the invention is to provide a control system for automobile testing devices wherein the power developed by an automobile at a predetermined speed may be readily ascertained.

Another object of the invention is to provide a control system for automobile power testing devices wherein it is possible to ascertain quickly the foot pounds of torque at any predetermined speed.

A further object of the invention is to provide a control system for automobile power testing devices wherein the operating efficiency of any automobile may be readily and quickly determined and compared with the maximum efficiency of such automobile at the same speed, and its efficiency ratio ascertained.

A further object of the invention is to provide a fluid pressure control system for automobile power testing devices wherein a centrifugal pump is utilized for bucking the braking effect of the testing apparatus to maintain operation of the automobile undergoing test at constant speed.

A yet further object of the invention is to provide an automobile testing apparatus wherein the driving wheels of the automobile are positioned in driving contact with friction wheels of the apparatus for operating brake mechanism set for a predetermined speed, together with fluid pressure control means wherein a centrifugal pump is utilized to buck the brake action of the testing mechanism for maintaining the operation of the automobile at a predetermined constant speed, and wherein the power developed by the automobile under such conditions may be readily observed on a gauge which is responsive to the torque developed during the test.

Another and still further object of the invention is to provide an automobile testing apparatus whereby it is possible to compare the performance of any car with data of such car when in perfect operating condition in order to determine the efficiency of the test car. The apparatus is especially useful in checking performance of cars on which work has been done and also in connection with the purchase of a used car. It is useful also to determine the efficiency at any time of any automobile.

The above, other and further objects of the invention will be apparent from the following description, accompanying drawings and appended claims.

An embodiment of the invention is illustrated in the accompanying drawings and the views thereof as follows:

Figure 1 is a side elevational view of the general arrangement of a testing apparatus embodying the present invention and showing an automobile positioned on the platform of the apparatus for test purposes.

Figure 2 is an enlarged fragmental elevation view of certain details of the fluid pressure control valve system of the present invention.

Figure 3 is a top plan view of the testing apparatus of Figure 1 with a part of the floor removed, showing details of construction and indicating in dotted lines the position of the automobile wheels during a test.

Figure 4 is a side elevational view of a portion of the brake mechanism showing particularly its relation to the gauge actuating means for indicating the power and/or torque developed by an automobile undergoing test.

Figure 8 is an enlarged sectional view of a regulator for timing the duration of a test.

Figure 9 is a diagrammatic view of the trip lever and its connection to certain parts of the apparatus.

Figure 5:
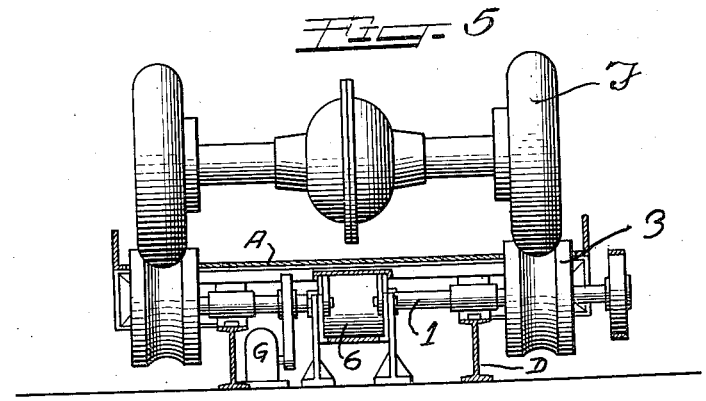
Figure 5 is a sectional view taken substantially on line V—V of Figure 3 and showing diagrammatically the driving wheels of an automobile associated with the friction wheels of the testing apparatus.

The drawings will now be explained.

The testing apparatus in the illustrated form includes a platform A supported on cross members B which in turn are fastened to sills D. The parts just mentioned may be of structural steel, wood or any suitable material.

The platform A is elevated from the floor of the building in order that the mechanism of the test apparatus may be installed underneath the platform of the apparatus and above the floor of the building, or other place where the apparatus is installed.

An approach E is provided whereby an automobile may readily enter and leave the testing apparatus.

The frame structure of the testing apparatus includes the sills D.

A shaft 1 is carried by journals 2 fastened to the sills D and supported transversely of the platform near one end thereof and preferably near the end to which is connected the approach E, i. e., the entering end.

Friction wheels 3 are secured to the shaft adjacent each end thereof and have the faces thereof illustrated as concave to receive the wheels of an automobile undergoing test. The faces of the wheels 3 may be flat or other shape if desired.

Idler wheels 4 carried on stub shafts 5 secured to the sills D are provided ahead of the friction wheels 3 so that a driving wheel F of the automobile may rest on a friction wheel 3 and an idler wheel 4 at one side of the apparatus. The faces of the idler wheels 4 are the same as the faces of the friction wheels 3.

A brake drum 6 is secured to the shaft 1 preferably between the sills D and rotates with the shaft.

Two brake shoes 7 and 8 are provided bearing against the brake drum 6 with the shoe 7 as the upper one and the shoe 8 as the lower.

The upper brake shoe 7 is carried by a brake arm 9 while the lower shoe is carried on a brake arm 10. The arm 9 has a depending part 11 while the arm 10 has an upstanding similar part 12 which parts 11 and 12 are pivoted together at 13 to enable the brake shoes 7 and 8 to be moved towards and away from the brake drum 6, by pivotal movement of the arms 9 and 10 about the pivot 13, as the arms are otherwise free.

The other end of the brake arm 9 is pivotally connected at 14 to a pressure responsive means such as bellows 15. The other end of the arm 10 is offset at 16 which offset end 16 rests on another pressure bellows 17.

The bellows 17 has its lower end secured to a part 18 of the frame which end therefore is fixed to the frame.

The brake system just described will, as it may be observed, tend to rotate about the axis of the brake drum 6 as a center as the drum rotates with the shaft, as the ends of the arms 9 and 10 are free to move in a manner to be hereinafter more fully described.

A pipe 19 communicates with the interior of the bellows 17 at one end and at the other end with a gauge 20 which gauge is placed in any convenient position to be readily observed by the operator of the automobile or by the attendant making the test. A fluid is contained within the bellows 17 and pipe 19 without escape therefrom or without additions thereto except when it is necessary to replace evaporated fluid. The fluid thus entrapped in the bellows 17 and pipe 19 actuates the gauge 20 as the bellows 17 is compressed or expanded in a manner to be hereinafter more fully described. The fluid used is of such nature as not to be affected by weather or temperature changes.

The gauge 20 is supported on an upright structure 21 at one end of the testing apparatus. This gauge of course could be installed anywheres else as desired.

The bellows 15 is free to move with the arm 9, being suspended from said arm and connected to arm 10.

The hydraulic pressure system illustrated includes a centrifugal pump G supported on the testing apparatus in any suitable manner as, for instance, by connection to one of the sills D. The pump is driven from the shaft 1 by means of a belt 22 passing over a pulley 23 on shaft 1 and a pulley on the pump shaft.

A liquid or other fluid supply cylinder H or tank of any suitable shape and size is supported in the frame and communicates with the inlet side of the pump G by means of a pipe 23. A pipe 24 leads from the outlet side of the pump G to a header 25 which is illustrated as a pipe of greater diameter than the pipe 24. The header 25 is connected to a T 26 from one branch of which a return pipe 27 leads to the supply tank H.

A pipe 28 leads from the header 25 to a T 29. A branch 30 extending from one side of the T 15 is provided with a valve 31 which in turn communicates with a T 32 and with a valve 33 on the opposite side of the T 32 which valve is connected to a high pressure tank K.

The other side of the T 29 is connected to a valve 34 which in turn is connected to a pipe 35.

Leading from the T 32 is a branch 36 which is connected to a flexible conduit or hose 37 which communicates with the interior of the pressure bellows 15.

The valves 31, 33 and 34 respectively are provided with handles 38, 39 and 40 respectively. The handles extend in the same angular direction and are all connected to a cable 41.

A cable 41 is connected at one end to a spring 42 which in turn is fastened to a projection 43 on one of the sills D. The other end of the cable 41 is attached to a second spring 44 which in turn is connected by a cable 45 to a rocker arm 46 pivoted to one of the sills D.

Figure 7:
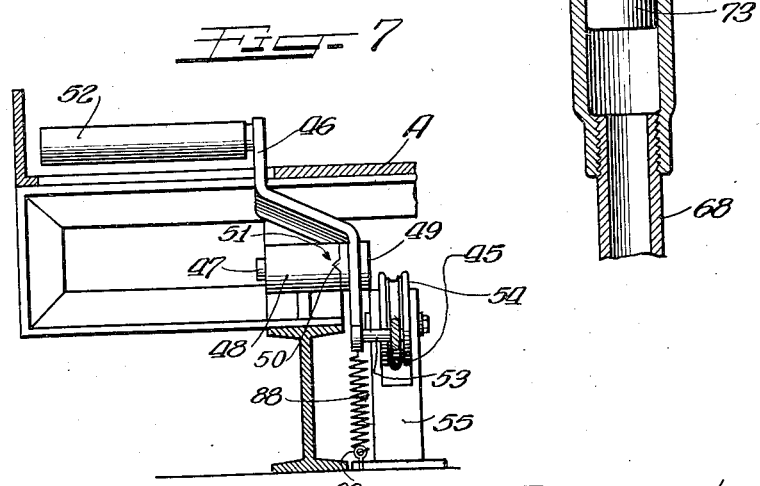
Figure 7 is an elevational view partially in section showing a trip lever in the path of a wheel of an automobile and normally projecting above the floor of the testing platform.

Figure 7 illustrates the rocker arm 46 as pivoted on a stud 47 which extends through a block 48 secured to the frame structure. The rocker arm 46 has an enlargement 49 to which is attached the stud 47 and which enlargement is provided with a tooth 50 for entering a recess 51 in the block 48 to retain the rocker arm 46 in position above the floor of the platform. The rocker arm 46 carries at its upper end a roller 52 which lies in the path of a wheel of the automobile undergoing test. The other end of the rocker arm is provided with a pin 53 to which is attached the cable 45. The cable 45 passes under a roller 54 supported in a standard 55 on the floor or suitably secured to the frame structure of the testing apparatus.

The shaft 1 is extended beyond the side of the apparatus at one end and carries pulleys which drive belts 56 and 57.

The belt 56 operates what is termed herein as a high pressure pump L while the belt 57 drives a governor valve M.

A pipe 58 is connected to the discharge side of the pump L and leads to a T 59. A branch pipe 60 connects the T 59 with the pressure tank K.

A short pipe 61 connects the T 59 with another T 62.

A pipe 63 leads from the T 62 to the T 26 connected with the supply tank H.

A bleeder or leak 64 is interposed in the pipe 63 to serve as a restriction to the passage of liquids or fluids to the supply tank H from the governor.

A T 65 is connected in the pipe 27 between it and the supply tank H and has a branch 66 which extends to the inlet side of the pump L and supplies to said pump.

The connections of the pipes 27 and 23 with the supply tank H is such as to be supplied at all times with liquid from said tank for maintaining the pipes 66 and 23 full of such liquid.

The governor M is interposed in the pipe 63.

A T 67 is connected into the pipe 63 between the governor M and the leak 64 and has a branch 68 communicating with the lower end of a governor controlled valve O.

Figure 6:
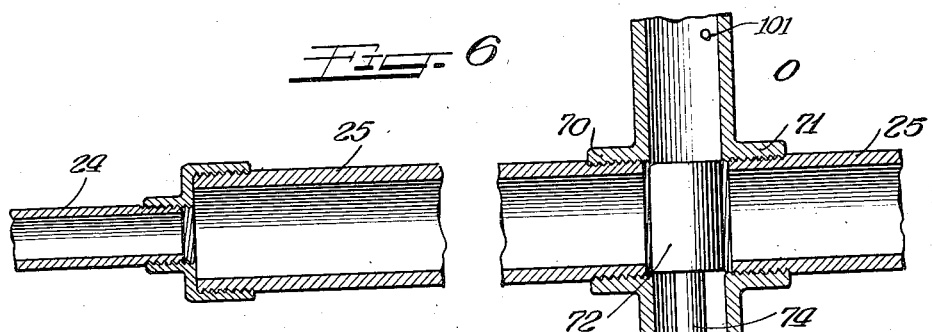
Figure 6 is an enlarged fragmental sectional view of one form of relief valve for the pressure system.

The details of the governor controlled valve O are illustrated in Figure 6 and as there illustrated include a cylindrical body 69 having oppositely disposed threaded collars 70—71 for receiving portions of the header pipe 25 on each side of the body. The valve body 69 is disposed vertically in the apparatus.

A piston having in fact two effective heads 72 and 73 connected by a stem 74 reciprocates in the body 69. The length of the head 72 is such as to close passage through the header 25 when the head 72 is disposed in the casing 69 in the position illustrated in Figure 6. The piston or head 73 is acted against by the pressure set up in pipe 68 by the pump L which pressure is controlled by the governor valve M. The upper end of the casing 69 is open to the atmosphere.

A cylinder P, termed herein the timer cylinder, is connected to the pipe 35 near the valve 34. A connecting pipe 75 leads from the tank P to the pipe 35 for passage of fluid through the same. A piston 76 is movable within the cylinder P and has attached to it a piston rod 77 which extends outwardly of the cylinder P. A lever 78 pivoted at 79 has one end overlying the upper end of the piston rod 77 and its other end 80 against one arm 81 of a trip Q.

The cable 45 is provided at each end of the spring 44 with latch hooks 82 and 83. The latch or trip Q is engageable over the latch hook 83 under certain conditions while a similar trip R engages the latch hook 82.

A coin box S is installed adjacent the driver's side of the automobile so that the driver may deposit a coin of suitable amount in the box for actuating the test mechanism. A lever 84 is released for operation by deposit of the proper coin, so that when the driver of the automobile actuates the lever 84, the trip or latch R releases the latch hook 82. A suitable connection such as a cable 85 connects the lever 84 and the latch or trip R.

The illustrated means for rocking the latch R includes a block 86 pivoted to the frame at 87 and having one end normally against the free end of the latch R and the cable 85 connected to its other end, in such manner that when the cable is moved by actuation of the lever 84 of the coin control mechanism, the block 86 will rock about its pivot in clockwise direction (Fig. 9) and disengage the latch R from the latch block 82. The cable 85 engages a pulley 90 between the trip R and the coin box S.

The wheel actuated rocker arm 46 is maintained normally in vertical positon by a spring 88 which is connected to the lower end of the rocker arm at one end of the spring and, with the other end of the spring fastened to the floor or frame structure, as, for instance, by an eye 89, as illustrated in Figure 7. The spring 88, as before stated, maintains the rocker arm 46 in vertical position, so that, when the arm is rocked in either direction by a wheel of the automobile, it will assume vertical position in the path of the wheel, when the automobile wheel passes. The cable 45 passes about a pulley 54 and is connected to the lever or arm 46 to be tensioned whenever the arm or lever is rocked in either direction.

The pipe 35 which is connected to the T 62 adjacent the high pressure pump L has in it a T 91 into which is connected the pipe 75 communicating with the timer tank P. A check valve 92 is interposed in the pipe 35 between the pump L and the timer tank P. A leak 93 similar to leak 64 is interposed in the pipe 35 adjacent the check valve 92. The leak may be adjusted so that passage of fluid through the pipe 35 from the pump L may be regulated as desired.

The apparatus of this invention is designed to be actuated by the driving wheels of an automobile engaging the friction wheels 3 of the apparatus.

The brake arms 9 and 10 are fulcrumed on the brake drum 6 for engagement of the shoes 7 and 8 with the drum. The arms are pivoted together at 13 for relative angular movement, and the tendency of these arms is, when the friction wheels 3 and the brake drum 6 are rotated by the driving wheels of the automobile, to rotate with the friction wheels 3 (Figure 4) in counterclockwise direction, so that there is a tendency of the arms 9 and 10 to rotate about the shaft 1 as a center, thereby tending to relieve the weight of the supported arm 10 on the bellows 17.

The arm 10 rests on the bellows 17 when the parts are at rest, and creates maximum pressure in the bellows 17 and the pipe 19, so that the finger on the gauge 20 at the time of maximum pressure is at zero. As the tendency of the arms 9 and 10 to rotate in counterclockwise direction is set up by the brake mechanism, pressure within the bellows 17 is relieved, whereupon the finger of the gauge 20 moves in accordance with the decrease of pressure within the bellows 17, thereby indicating on a scale of the gauge the information desired. This information may be calibrated in horse-power or in torque in terms of foot pounds, proper calibrations, of course, being computed in laying out the scale in accordance with the variation of pressure in the bellows 17 responsive to the braking action of the mechanism. The parts as illustrated in Figure 3 are in normal position, i. e., the position to which the various parts are moved when an automobile leaves the platform A and ready for another test.

The valves 33 and 34 are opened and the valve 31 closed when the handles occupy the full line position of Figures 3 and 9. The pressure tank K is therefore in communication with the bellows 15 for supplying maximum fluid pressure to said bellows to clamp the brake shoes 7 and 8 against the drum 6 for locking the friction wheel 3 against rotation in order to enable an automobile to be driven onto the testing platform and also driven off at the end of the test.

The operation of the apparatus is as follows:

Any suitable fluid may be used but a mixture of alcohol and water has been found satisfactory.

The condition of the various valves and other parts as shown in normal position in Figures 3 and 9 and immediately prior to any test is as follows:

Valves 33 and 34 are opened and valve 31 is closed. Thus the control valve M is wide open and valve O is closed, that is, the piston 72 is at the bottom of the position shown in Figure 6 closing the passage through the header 25. Fluid under pressure from the tank K is admitted to bellows 15 through the valve 33 and hose 37 and the excess pressure over and above that necessary to hold the friction wheels against rotation passes out through the pipe 60, check valve 100 back to the supply tank H through the pipe 63.

The car is driven onto the platform and a front wheel engages and rocks the lever arm 46 in clockwise direction, as viewed in Figure 9. However, nothing happens, as movement of the lever arm in this direction has no effect on any part of the mechanism, as the cable 45 was tensioned and the latch hook 83 engaged with latch or trip Q when the previous car was removed from the apparatus. Slack in cable 45 allows rocking of the arm 46 without disturbing anything. The car is stopped when the driving wheels rest on the friction wheels 3 and the idler wheels 4.

The operator or driver of the automobile thereupon deposits a coin of proper value in the coin box S and actuates the lever 84, whereupon the trip or latch R is tripped, releasing the latch hook 82 from engagement. Spring 44 thereupon draws the cable 41 to the right, as viewed in Figures 3 and 9, as said spring is stronger than the spring 42, moving the handles of the valves 33, 31 and 34 to the right of the positions shown in Figures 3 and 9, i. e., to dotted line positions of Figure 9. Movement of the valve handles in the manner stated closes valves 33 and 34 and opens valve 31. Closing valve 33 cuts off communication between the high pressure tank K and the brake bellows 15 while opening of valve 31 and closing valve 34 opens communication between the bellows 15, pipe 28, header 25 and supply tank H, thus relieving braking pressure in bellows 15 so that rotation of the automobile wheels will now rotate the friction wheels 3 without forward or backward movement of the automobile. Operation of the driving wheels F of the automobile in forward direction will thereupon rotate the friction wheels 3 in counterclockwise direction, as viewed in Figure 4, as the brake shoes have, by this time, been relieved of maximum pressure against the brake drum.

Rotation of the friction wheels will immediately actuate the centrifugal pump G, which draws fluid from the tank H and delivers it through the pipe 24 to the header 25. Some of the fluid will pass through pipe 28, valve 31 to the brake bellows 15 for building up braking pressure therein, and some of the fluid will continue through the header 25 back to the supply tank H.

The high pressure pump L is likewise set in motion and fluid is drawn from the supply tank H through the pipe 66 through the inlet side of the pump and discharged from the pump with part passing through the pipe 63 and part through the pipe 35. The leak 64 in the pipe 63 necessarily precludes the passage of all the fluid through the pipe 63, so that necessarily some is diverted into the pipe 35.

The governor valve M likewise is brought into action and it controls passage of liquid through the pipe 63. The parts are so arranged that the valve M is open when the friction wheels 3 are at rest, or are rotating at a speed less than that to be maintained, and is closed at speeds above that to be maintained. When the wheels 3 start to rotate, the pump L creates pressure through the valve M, and control valve O. Figure 6 shows the normal position of the piston 72 of the control valve O when there is no pressure in the line. As soon as the pump L creates pressure in the line, the piston 72 is moved upwardly against the stop 101 which establishes a free fluid passage through the header 25, thereby preventing appreciable development of pressure in the header. When the friction wheels 3 reach the speed to be maintained, the governor valve closes with the result that pressure against the head 73 connected with the piston 72 falls slowly, the fluid passing through the leak 64 to the supply tank 8. This reduction of pressure under the head 73 allows piston 72 to gradually drop thereby gradually restricting fluid passage through the header 25. Such a restriction of fluid pressure in the header 25 increases the fluid pressure in the bellows 15 whereupon the brakes are applied to the brake drum. Application of the pressure to the bellows 15 thereupon slows the friction wheels 3 by overbalancing the driving effort. The piston 73 settles in such position where the braking effort maintains the speed of the friction wheels 3 at the desired rate and at which speed the governor valve M is set to open. At this point in the operation of the apparatus, the valve M floats, as it were, ever ready to open or close in accordance with slight variations in speed or pressure.

The various parts are so arranged and adjusted, however, that the speed of the friction wheels and shaft 1 is brought up to operating speed, which is predetermined, and set by arrangement of the various valves to maintain operation at constant speed at the predetermined rate. Let it be assumed that this represents a speed of 35 miles per hour for the automobile.

During the time that the apparatus is coming up to a speed of 35 miles an hour, the pump L delivers fluid under pressure to the tank K, where pressure is built up because the valve 33 is closed.

The pump L also delivers fluid under pressure through the pipe 35 to the timer cylinder P but which, by provision of the leak 93, is restricted in amount. The timing of the movement of the piston 76 in cylinder P is controlled by the opening in the leak 93 which may be varied as to size to pass such fluid under pressure which will, in a given time, be sufficient to raise the piston to trip the latch Q. The valve 34, during test, is closed between pipes 83' and 60 hence fluid in pipe 83' stops at valve 34 and additional fluid passes into the cylinder P to raise the piston 76. However, some fluid under pressure passes through the timer tank P and gradually moves the piston 76 in said tank upwardly until the trip or latch Q is tripped after a predetermined time interval, freeing the latch hook 83 from engagement, releasing the tension of spring 44 and stopping the test, whereupon the spring 42 comes into play, moves the cable 41 to the left, returning the valve handles to the full line position of Figures 3 and 9, with the following results:

Movement of the handle 38 of the valve 31 closes communication between the header 25 and the brake bellows 15 and movement of the handle 39 opens communication between the pressure tank K and the bellows 15, whereupon the stored up pressure in the tank K is delivered to the bellows, expanding the same to clamp the brake shoes tightly against the brake drum, bringing rotation of the parts to rest, and at the same time holding the friction wheels 3 against rotation so that the automobile may now be driven off the platform.

The moment rotation of the shaft 1 and its connected pumps ceases, the fluid returns to the supply tank H except that which is in the tank K, bellows 15 and the hose 37. The fluid in cylinder P gradually falls, escaping through pipe 35, valve 34 to pipe 28 hence to header 25 to supply H, the piston 76 thus returning to normal position.

The leak 93 is so adjusted as to allow passage of a certain amount of fluid through the timer tank P for upward movement of the piston 76 thereof for stopping the test at any time period as desired. This may be anywhere from three, five, ten or more seconds up, as determined, and may be readily varied by changing the size of the opening of the leak.

The automobile, in backing off of the platform, engages the rocker lever 46 and moves it in counterclockwise direction as observed in Figure 9. Such movement thereupon returns the catches 82 and 83 to the latching positions shown in Figures 2 and 9. The catch 82 prevents movement of the valve handles to operating position, by engaging trip R. The spring 44 allows movement of the hook 83 into locking engagement with trip Q after latch hook 82 has engaged its trip R. The spring 88 returns the arm 46 to a vertical position as soon as the same is freed from engagement by a wheel of the automobile. This movement sets the parts for the next test, with the parts then being in the positions shown in Figures 3 and 9.

The check valve 92 in the pipe 35 prevents return of liquid from cylinder P to the pump L, so that any excess liquid in this pipe at the left of the check passes into the hose 37 and brake bellows 15 or to header 25 and supply tank H. This allows return of the piston 76 of the timer tank P to normal position. Of course, enough of the fluid is trapped in the pipe 75 and cylinder P to form a cushion for the piston 76 in order that the timer cylinder or tank may actuate in a manner heretofore stated as the pressure therein is again built up by the pump L.

The efficiency of the engine of the automobile is transmitted through the brake system to the bellows 17 and tends to rotate the brake arms 9 and 10 in counterclockwise direction to relieve pressure on the cylinder 17. Such relief of pressure correspondingly reduces the pressure against the finger of the dial 20 so as to allow movement of the finger, thus indicating on the scale of the gauge or dial certain data concerning the condition of the engine, in terms of the torque developed.

Conveniently placed with respect to the test apparatus may be a table showing the maximum performances possible of all makes of automobiles at a speed of say 35 miles an hour. The effect of the test of any car as observed on the gauge 20 may then be compared with the table and the efficiency ratio readily determined.

The centrifugal pump G is selected of proper size and proportions to maintain at a speed of 35 miles an hour sufficient bucking pressure against the action of the brakes as to maintain rotation of the shaft 1 at constant speed. The centrifugal pump G, in effect, bucks the braking action.

The governor valve M is set so that it is open when there is no test being made, but, as the test starts and continues, gradually closes, and is completely closed when the predetermined testing speed for which it is set, namely, that of 35 miles per hour, is reached.

The pressure generated by a centrifugal pump increases or decreases at a rate faster than the rate of change of speed.

The power of the automobile engine varying as the speed and the power of the centrifugal pump varying as the square of the speed form a basis for calibrating the dial of the scale 20.

Assume, by way of example, that the automobile being tested develops 40 H. P. at 35 miles an hour and that the diameter of the test wheel, i. e., the friction wheel 3, is 18 inches and that it revolves at 650 R. P. M. Assume, also, that the distance from the center of the wheel to the point of the bellows support between the arm 10 and the bellows 17 is 45 inches. We would then have the following equation:

$$40\ H.\ P. = \frac{P \times 650 \times 90 \times pi}{12 \times 33{,}000}$$

Solving the equation, we find the pressure to be approximately 86 lbs.

The horse power, in other words, is the foot pounds per minute divided by 33,000, consequently, knowing the pressure, we can readily determine the horse power, as the horse power equals the pressure times the speed, and, as before stated, the speed is set at 35 miles an hour, and the pressure, of course, remains constant, whereupon the H. P. of the automobile may be very readily ascertained and compared with a master chart.

Claims generic to the present invention are included in applicant's co-pending application Serial No. 243,796.

I am aware that many changes may be made and numerous details of construction may be varied through a wide range without departing from the principles of this invention, and I therefore do not purpose limiting the patent granted hereon otherwise than necessitated by the prior art.

The invention is claimed as follows:

1. An automobile tester including in combination, a fluid circuit, a rotary drum arranged to be driven by wheels of an automobile while undergoing test, brake shoes engaging said drum and tending to rotate with the same, a pair of substantially parallel arms extending away from said drum and carrying said shoes on opposite sides of the drum axis, means for varying the pressure in the circuit responsive to the movement of said arms, and a fluid pressure gauge responsive to the tendency of said arms to rotate with said shoes for indicating torque set up by the automobile wheels driving said drum.

2. An automobile testing apparatus including a platform, a shaft, friction wheels on said shaft engageable by the driving wheels of an automobile undergoing test, a brake drum driven by said shaft, brake arms engaging said drum, bellows for holding said arms in braking engagement with said drum, a fluid circuit, a centrifugal pump in said circuit driven by said shaft for supplying pressure to said bellows, a high pressure tank, communicating means between said tank and said bellows, a valve in said communicating means, and a lever operatively associated with said valve for opening communication between said tank and said bellows to increase the braking effect of said arms on said drum as said automobile is moved from the platform.

3. An automobile testing device including in combination, a shaft, a pair of friction wheels on said shaft, a brake drum on said shaft and driven by said wheels, a fluid circuit including a bellows and a centrifugal pump, said pump connected to be driven by said shaft, said bellows being connected to one of the brake arms engaging said drum, a valve controlling communication between said pump and said bellows, latch means for maintaining said valve in position to allow communication between said pump and said bellows, means for releasing said latch after a predetermined interval, said means including a cylinder in communication with said fluid pressure system and a piston movable within said cylinder responsive to the fluid supplied to said cylinder, said fluid pressure system having a restriction therein for controlling the admission of flow into said cylinder.

4. An automobile testing apparatus including a testing platform, a shaft, a pair of friction wheels on said shaft engageable by the wheels of an automobile undergoing test, a brake drum driven by said shaft, brake shoes engaging said drum, brake arms carrying said shoes, said arms being pivotally connected together intermediate the ends of the same, a fluid circuit, a gauge, a bellows, a pipe between said bellows and said gauge, one of said brake arms being floatingly supported on said bellows, another bellows connected with the other of said arms, a centrifugal pump driven by said shaft, connections between said pump and said second named bellows for moving its attached arm under influence of the pressure applied thereto, said arm tending to rotate with the said drum and thereby relieve weight of said first mentioned arm with respect to its supporting bellows for decreasing the pressure of the fluid within said first bellows and the gauge pipe as the pressure in the second named bellows is increased due to the speed of the pump.

5. An automobile tester including in combination, a shaft, a pair of friction wheels on said shaft drivable by the driving wheels of an automobile undergoing test, a brake drum rotated by said shaft, brake shoes engaging said drum, arms carrying said brake shoes, said arms being pivoted together, an indicating system including a bellows, a pipe and a gauge having fluid inescapably contained therein, said bellows supporting one of said brake arms and being compressible by said brake system whereby the fluid within said indicating system is compressed to maximum extent, a second bellows connected to the other brake arm, a fluid circuit, connections between said circuit and said second bellows, a centrifugal pump driven by said shaft and communicating with said second bellows for increasing pressure therein as said shaft and friction wheels increase in speed, the action of said second bellows as the pressure therein is increased tending to increase the frictional engagement with the brake shoes with the brake drum thereby tending to rotate the brake arms about the friction wheel shaft as an axis relieving the weight of the brake system on said first named bellows whereby the pressure therein is decreased accordingly, said gauge being calibrated to indicate the decrease in pressure in the indicating system as the braking effect is varied, fluid actuated means for maintaining said brake in tight frictional engagement with said drum to hold said friction wheels stationary when an automobile enters upon the same, means for releasing the brake from holding engagement with the brake drum for allowing rotation of the friction wheels, said centrifugal pump and said fluid system being balanced to maintain the friction wheels at constant speed by action of the pump in supplying pressure to said second bellows.

6. A fluid pressure automobile testing apparatus, including a fluid circuit, a shaft, a centrifugal pump in said fluid circuit, a pair of friction wheels on said shaft driven by the automobile wheels undergoing test, a brake drum driven by said shaft, brake shoes engaging said drum, brake arms carrying said shoes, said brake arms being pivoted together near the drum, a bellows, one of said arms having its remote end supported on said bellows, connections between said pump and said bellows, a second bellows, the other of said arms being connected to said second bellows, a brake system constituting a lever of the third class with the first mentioned bellows representing the weight and the second mentioned bellows as the power, said pump being actuated by said shaft for supplying fluid under pressure to said second bellows for increasing the braking effect of said shoes on said drum, the brake arms tending to rotate with the drum during braking engagement thus relieving the weight on said first mentioned bellows, a gauge connected to said first mentioned bellows for indicating the change in pressure therein set up by the tendency of said brake lever to rotate with the brake drum, said centrifugal pump building up pressure within said second bellows as the speed of said shaft and said friction wheels increases to a predetermined point, relief means in the connections between said pump and said first bellows for preventing increase of pressure within said second bellows when the pressure therein has increased to such a point as to maintain the speed of the friction wheels constant, and means responsive to fluid pressure for limiting the period of maximum pressure within said first mentioned bellows.

7. An automobile testing apparatus including a fluid pressure circuit, said circuit comprising a fluid supply, a pump, means for actuating said pump, a return connection between said pump and said supply having an enlargement for reducing pressure in said circuit without decreasing the speed of the pump, a bellows connected to said enlargement, a valve for opening and closing communication between said bellows and said enlargement, a brake mechanism actuated by said bellows for affecting the speed of said pump wherein the braking effect is proportioned to the pump speed, a supply of fluid under pressure, a valve controlled connection between said last named supply and said bellows, said last named valve being normally open whereby said fluid may expand said bellows, a spring normally maintaining said valve open, a second spring for closing said valve, a trip normally rendering said second spring ineffective for closing said valve, and a coin controlled mechanism for releasing said trip whereby said valve may be closed and said first mentioned valve may be opened between said enlargement and said bellows for allowing escape of fluid from said bellows.

8. An automobile testing apparatus including a fluid pressure circuit, said circuit comprising a fluid supply, a pump, means for actuating said pump, a return connection between said pump and said supply having relief means in it for reducing pressure in said circuit without decreasing the speed of the pump, a bellows connected to said enlargement, and a valve for opening and closing communication between said bellows and said enlargement, a brake mechanism actuated by said bellows for affecting the speed of said pump wherein the braking effect is proportioned to the pump speed, a supply of fluid under pressure, a valve controlled connection between said last named supply and said bellows, said last named valve being normally open whereby said fluid may expand said bellows, a spring normally maintaining said valve open, a second spring for closing said valve, a trip normally rendering said second spring ineffective for closing said valve, a coin controlled mechanism for releasing said trip whereby said valve may be closed and said first mentioned valve may be opened between said enlargement and said bellows for allowing escape of fluid from said bellows, and means for rendering ineffective said second spring whereby said first spring becomes effective to close said first valve and open said second valve.

9. An automobile testing apparatus including a fluid pressure circuit, said circuit comprising a fluid supply, a pump, means for actuating said pump, a return connection between said pump and said supply having an enlargement for reducing pressure in said circuit without decreasing the speed of the pump, a bellows connected to said enlargement, a valve for opening and closing communication between said bellows and said enlargement, a brake mechanism actuated by said bellows for affecting the speed of said pump wherein the braking effect is proportioned to the pump speed, a supply of fluid under pressure, a valve controlled connection between said last named supply and said bellows, said last named valve being normally open whereby said fluid may expand said bellows, a spring normally maintaining said valve open, a second spring for closing said valve, a trip normally rendering said second spring ineffective for closing said valve, a coin controlled mechanism for actuating said trip for closing said valve and opening said first mentioned valve between said enlargement and said bellows for allowing escape of fluid from said bellows, means for rendering ineffective said second spring whereby said first spring becomes effective to close said first valve and open said second valve, said circuit including a branch pipe section which is closed at one end during test, and means communicating with said section responsive to accumulation of fluid therein during test for actuating said last means when accumulated fluid reaches a predetermined point.

10. A fluid pressure control circuit including a fluid supply, a pump, means for driving said pump, circulating connections between said supply and said pump, a brake mechanism for controlling the speed of said pump, said mechanism including an expansion bellows connected to said circuit and responsive to pressure changes therein, a branch circuit, said first circuit including a valve responsive to flow through a part of said branch circuit for controlling fluid flow to said bellows.

11. A fluid pressure control circuit including a fluid supply, a pump, means for driving said pump, circulating connections between said supply and said pump, a brake mechanism for controlling the speed of said pump, said mechanism including an expansion bellows connected to said circuit and responsive to pressure changes therein, a branch circuit, said first circuit including a valve responsive to flow through a part of said branch circuit for controlling fluid flow to said bellows, a high pressure tank communicating with each of said circuits, a valved connection between said tank and said bellows, a valved connection between said first circuit and said bellows, said valves being connected for simultaneous operation whereby said bellows is placed in communication alternately with said tank and said first circuit.

12. A fluid pressure control apparatus including in combination, a main fluid circuit comprising a centrifugal pump, a fluid supply and circulating connections between each side of said pump and said supply, a branch fluid circuit comprising another centrifugal pump and connections between the said branch pump and said supply, and a valve in said main circuit responsive to flow in said branch circuit for controlling circulation through said main circuit.

13. A fluid pressure control apparatus including in combination, a main fluid circuit comprising a centrifugal pump, a fluid supply and circulating connections between each side of said pump and said supply, a branch fluid circuit comprising another centrifugal pump and connections between the said branch pump and said supply, a valve in said main circuit responsive to flow in said branch circuit for controlling circulation through said main circuit, a bellows, connections between said bellows and each of said circuits, valves in said connections connected for simultaneous operation for alternately placing said bellows in communication with either of said circuits.

JACOB L. SHROYER.